United States Patent
Koeppel et al.

(10) Patent No.: US 10,453,061 B2
(45) Date of Patent: Oct. 22, 2019

(54) NETWORK OF TRUST

(71) Applicant: Capital One Services, LLC, McLean, VA (US)

(72) Inventors: Adam Koeppel, Washington, DC (US); Tyler Locke, Washington, DC (US); James Zarakas, Centreville, VA (US)

(73) Assignee: Capital One Services, LLC, Mclean, VA (US)

( * ) Notice: Subject to any disclaimer, the term of this patent is extended or adjusted under 35 U.S.C. 154(b) by 0 days.

(21) Appl. No.: 15/909,091

(22) Filed: Mar. 1, 2018

(65) Prior Publication Data

US 2019/0272541 A1 Sep. 5, 2019

(51) Int. Cl.
*G06Q 40/00* (2012.01)
*G06Q 20/40* (2012.01)
*H04L 29/06* (2006.01)

(52) U.S. Cl.
CPC .......... *G06Q 20/401* (2013.01); *H04L 63/10* (2013.01)

(58) Field of Classification Search
None
See application file for complete search history.

(56) References Cited

U.S. PATENT DOCUMENTS

| 8,700,526 | B1 | 4/2014 | Cozens et al. |
| 2010/0030578 | A1 | 2/2010 | Siddique et al. |
| 2010/0043056 | A1 | 2/2010 | Ganapathy |
| 2010/0078472 | A1 | 4/2010 | Lin et al. |
| 2013/0085931 | A1 | 4/2013 | Runyan |
| 2014/0379584 | A1 | 12/2014 | Ward |
| 2015/0100482 | A1 | 4/2015 | Zamer et al. |
| 2016/0337863 | A1 | 11/2016 | Robinson et al. |
| 2017/0006453 | A1* | 1/2017 | Liu ........................ H04W 8/005 |
| 2017/0180128 | A1 | 6/2017 | Lu |
| 2017/0186003 | A1* | 6/2017 | Monaghan ........... G06Q 20/405 |
| 2017/0187831 | A1 | 6/2017 | Otting et al. |
| 2017/0236118 | A1 | 8/2017 | Laracey |
| 2018/0183587 | A1 | 6/2018 | Won et al. |
| 2018/0341775 | A1 | 11/2018 | Gisolfi et al. |

FOREIGN PATENT DOCUMENTS

EP 2897094 A1 * 7/2015 ............. G06Q 20/40

OTHER PUBLICATIONS

Ron White, How Computers Work, Oct. 15, 2015, 03, Que Publishing, 7th Ed, p. 4 (Year: 2003).

* cited by examiner

*Primary Examiner* — Olabode Akintola
(74) *Attorney, Agent, or Firm* — DLA Piper LLP US

(57) ABSTRACT

A user device may detect at least one external device in communication range of the device, receive at least one external device identifier from the at least one external device, generate a transaction request comprising data describing a transaction to be processed and the at least one external device identifier, and send the transaction request to a transaction service for fulfillment. The transaction service may receive the transaction request, analyze the at least one external device identifier to identify at least one security factor associated with the at least one external device identifier, adjust a security score for the transaction based on the at least one security factor, and determine whether to process the transaction based on the adjusted security score.

12 Claims, 9 Drawing Sheets

NETWORK OF TRUST

BACKGROUND

Various electronic devices are configured to perform financial transactions such as exchanging value in an account (e.g., monetary value in a debit or credit account) for goods and/or services. Ensuring that these transactions are legitimate (e.g., are actually being conducted between the purported parties) is a matter of great concern. For example, a user of an electronic device may have an account with a bank or other financial institution. To request a transaction, the electronic device generate a transaction request and send the request to a server operated by the financial institution. The server may analyze the request and determine how likely it is to be legitimate. For example, the server can adjust a security score for the transaction (e.g., elevate a threat level if there are potential problems). Transactions with especially problematic scores can be analyzed for legitimacy and/or declined.

SUMMARY OF THE DISCLOSURE

Systems and methods described herein may enhance security of financial transactions by generating data that may be added to a transaction request to provide evidence of the request's validity. For example, a user device may communicate with nearby devices using one or more wireless communication technologies. The user device may gather data about the nearby devices and add this data to a transaction request. The user device may send the transaction request to a financial institution server, for example a server of a bank or credit card company maintaining a credit or debit account for the user of the device. The server may check the information in the request, including the data about the nearby devices, to evaluate a risk level of the transaction being requested.

For example, a device configured to initiate secure transactions may include a processor, a wireless transceiver in communication with the processor, and a non-transitory memory storing instructions that, when executed by the processor, cause the processor to perform processing. The processing may include detecting, using the wireless transceiver, at least one external device in communication range of the device and receiving, by the wireless transceiver, at least one external device identifier from the at least one external device. The processing may include generating a transaction request, the transaction request including data describing a transaction to be processed and the at least one external device identifier, and sending the transaction request to a transaction service for fulfillment. The transaction may be permitted or denied based at least in part on the at least one external device identifier included in the transaction request sent by the processor.

In some embodiments, the processing may further include sending, by the wireless transceiver, a challenge to the at least one external device in response to the detecting. The at least one external device identifier may be received in response to the challenge. Generating the message may include including at least one of the received external device identifiers in the message.

In some embodiments, generating the transaction request may include adding geolocation data to the at least one external device identifier. In some embodiments, the transaction request may include a cryptogram, digital signature, cryptographically signed certificate, and/or other encrypted data containing the data describing the transaction to be processed and the at least one external device identifier. In some embodiments, the at least one external device identifier may include data identifying the at least one external device that sent the at least one external device identifier and data identifying at least one additional device external to the at least one external device that has been detected by the at least one external device within communication range of the at least one external device.

In some embodiments, the processing may further include receiving, by the wireless transceiver, a challenge from the at least one external device, generating a message including a device identifier for the device, and sending, by the wireless transceiver, the message to the at least one external device in response to the challenge.

In another example, a system configured to process secure transactions may include a processor, a transceiver in communication with the processor, and a non-transitory memory storing instructions that, when executed by the processor, cause the processor to perform processing. The processing may include receiving, by the transceiver, a transaction request from a user device, the transaction request including data describing a transaction to be processed and at least one external device identifier describing at least one device detected by the user device in proximity to the user device. The processing may include analyzing the at least one external device identifier to identify at least one security factor associated with the at least one external device identifier, adjusting a security score for the transaction based on the at least one security factor, and determining whether to process the transaction based on the adjusted security score.

In some embodiments, the analyzing may include determining whether the at least one device detected by the user device was detected by the user device during at least one previous transaction. The presence of the at least one device detected by the user device near the user device during the at least one previous transaction may cause an improvement in the security score for the transaction during the adjusting.

In some embodiments, the analyzing may include identifying a transaction type and determining whether the at least one device detected by the user device was detected by the user device during at least one previous transaction having the transaction type. The presence of the at least one device detected by the user device near the user device during the at least one previous transaction having the transaction type may cause an improvement in the security score for the transaction during the adjusting.

In some embodiments, the analyzing may include identifying a transaction location and determining whether the at least one device detected by the user device was detected by the user device during at least one previous transaction having the transaction location. The presence of the at least one device detected by the user device near the user device during the at least one previous transaction having the transaction location may cause an improvement in the security score for the transaction during the adjusting.

In some embodiments, the analyzing may include identifying a transaction time and determining whether the at least one device detected by the user device was detected by the user device during at least one previous transaction having the transaction time. The presence of the at least one device detected by the user device near the user device during the at least one previous transaction having the transaction time may cause an improvement in the security score for the transaction during the adjusting.

In some embodiments, the analyzing may include detecting an anomaly of at least one external device identifier. The presence of the anomaly may cause a downgrade in the security score for the transaction during the adjusting.

In some embodiments, the processing may further include analyzing the data describing the transaction to be processed to identify at least one additional security factor associated with the data describing the transaction to be processed. The at least one additional security factor may include at least one of a transaction amount, a merchant identity, a transaction type, a transaction time, and a transaction location. The adjusting may be further based on the at least one additional security factor.

In another example, a secure transaction method may include receiving, at a transaction processing server, a transaction request. The transaction request may include data describing a transaction to be processed, a device identifier describing a requesting device, and at least one external device identifier describing at least one device detected by the requesting device in proximity to the requesting device. The method may include determining, by a processor of the transaction processing server, a security risk level of the transaction based at least in part on a combination of the data describing the transaction to be processed, the device identifier, and the least one external device identifier. The method may include processing, by the processor of the transaction processing server, the transaction in response to the security risk level being below a threshold level and flagging, by the processor of the transaction processing server, the transaction for additional security risk analysis in response to the security risk level being above the threshold level.

In some embodiments, the determining may include detecting at least one abnormality due to at least one external device identifier that is unexpected given the device identifier and the data describing the transaction to be processed and increasing the security risk level in response to the detecting.

In some embodiments, the determining may include detecting a compromised external device based at least in part on the at least one external device identifier. The method may further include notifying a legitimate user of the compromised external device in response to the detecting.

In some embodiments, the determining may include detecting at least one external device identifier that was present for previous transactions by the requesting device and decreasing the security risk level in response to the detecting.

In some embodiments, the determining may include detecting at least one abnormality due to an external device identifier that is erroneous. The method may further include notifying a user of a device associated with the erroneous external device identifier in response to the detecting.

The systems and methods described herein may provide several technological advantages. For example, by gathering data about what devices are nearby, a transacting user device can add an indicator of the user's authentic identity to a transaction request (e.g., in addition to other indicators). Over time, as the user device requests more transactions, a record of devices near the user device can be built. If external devices are consistently near the user device when transactions are made, this may indicate a likely authenticity of the transaction. Conversely, if strange devices are found near the user device, this may suggest that the user's identity has been stolen or the device has been stolen, for example. Moreover, the communications between the user device and local external devices may be able to reveal that an external device has been compromised (e.g., when an unexpected communication is received from the compromised external device). In summary, the systems and methods described herein may provide an automatic indicator of trust based on networking capabilities uniquely and seamlessly provided by devices in proximity to one another.

DETAILED DESCRIPTION OF SEVERAL EMBODIMENTS

Figure 1A:
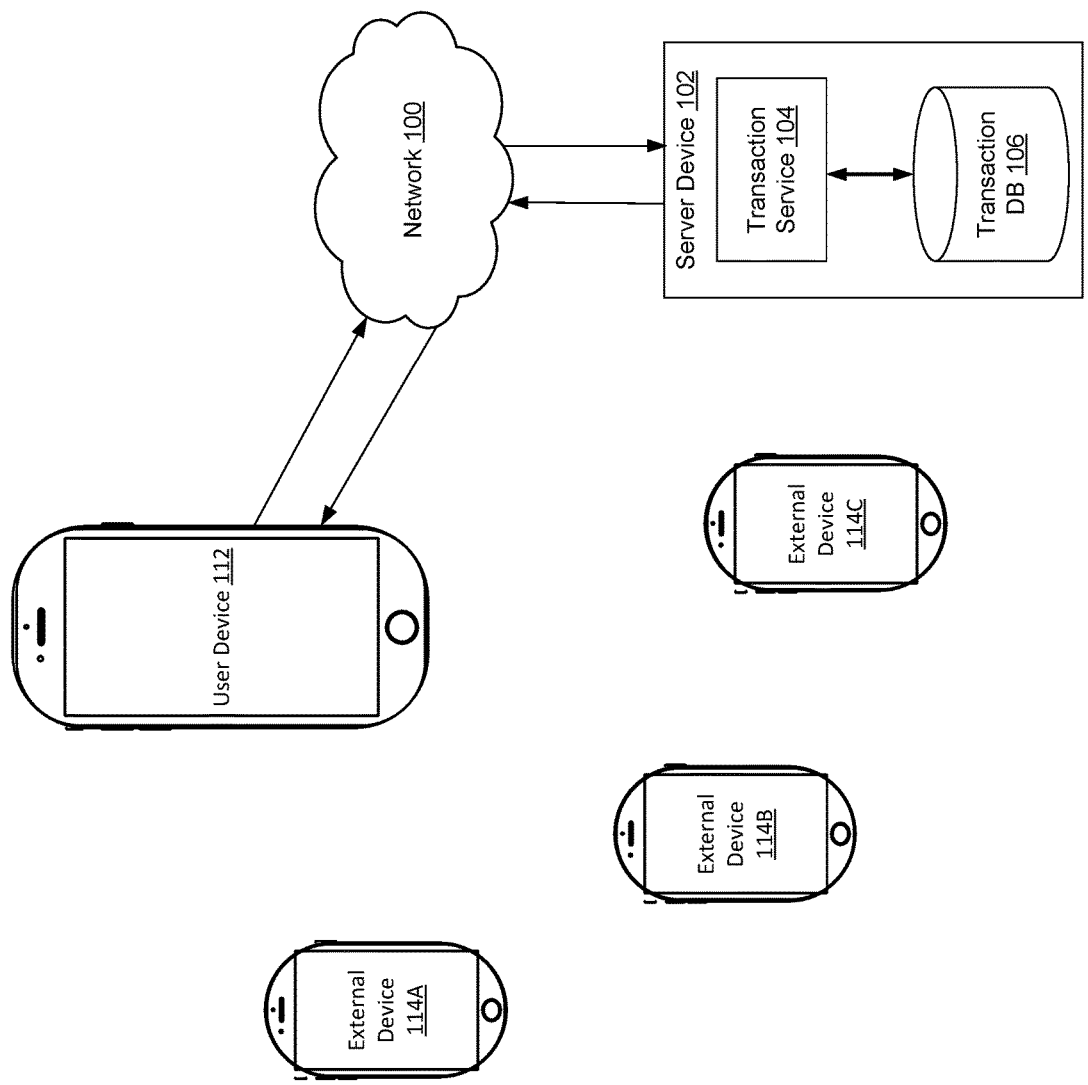
FIGS. 1A-1D show a network of trust according to an embodiment of the present disclosure.
Figure 1B:
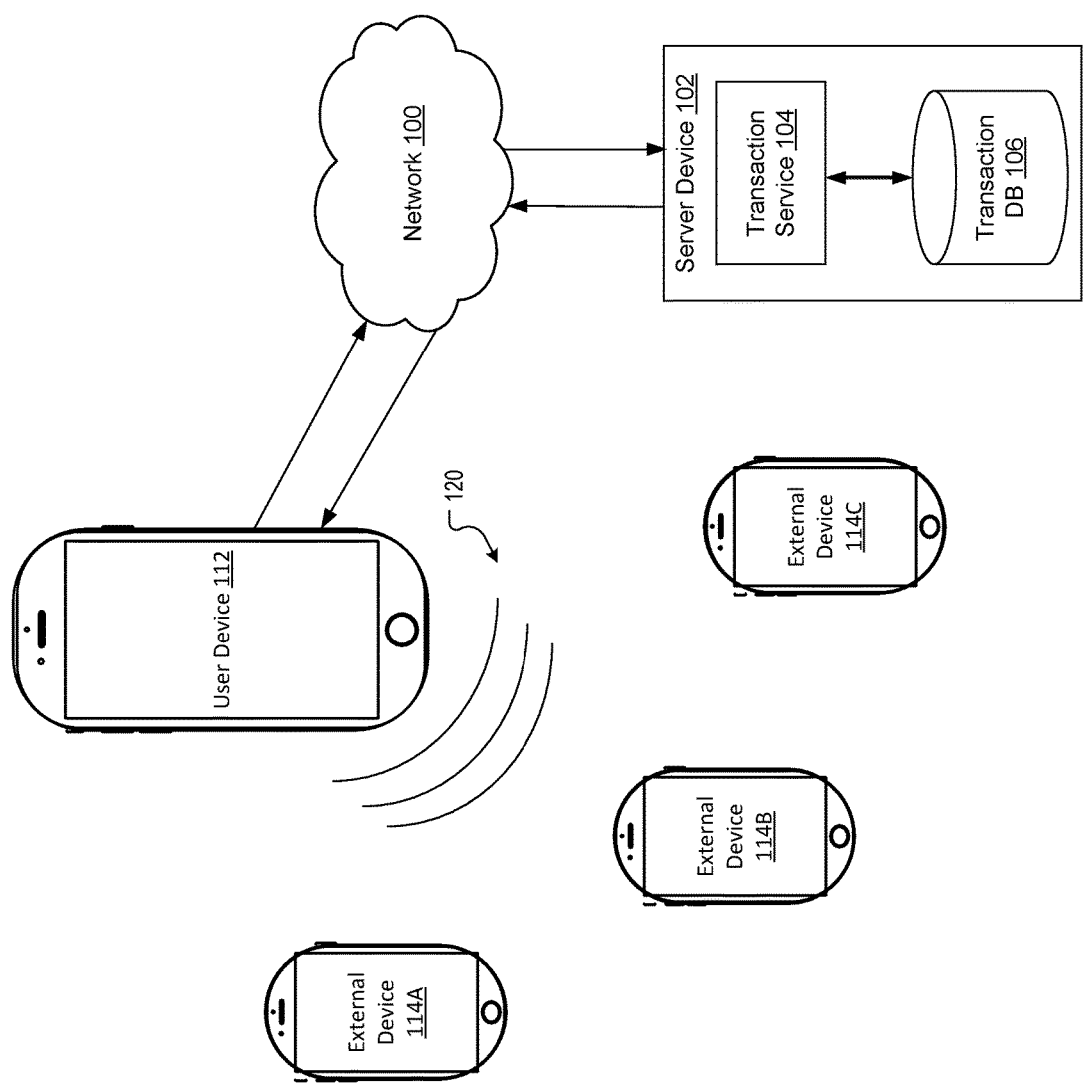
Figure 1C:
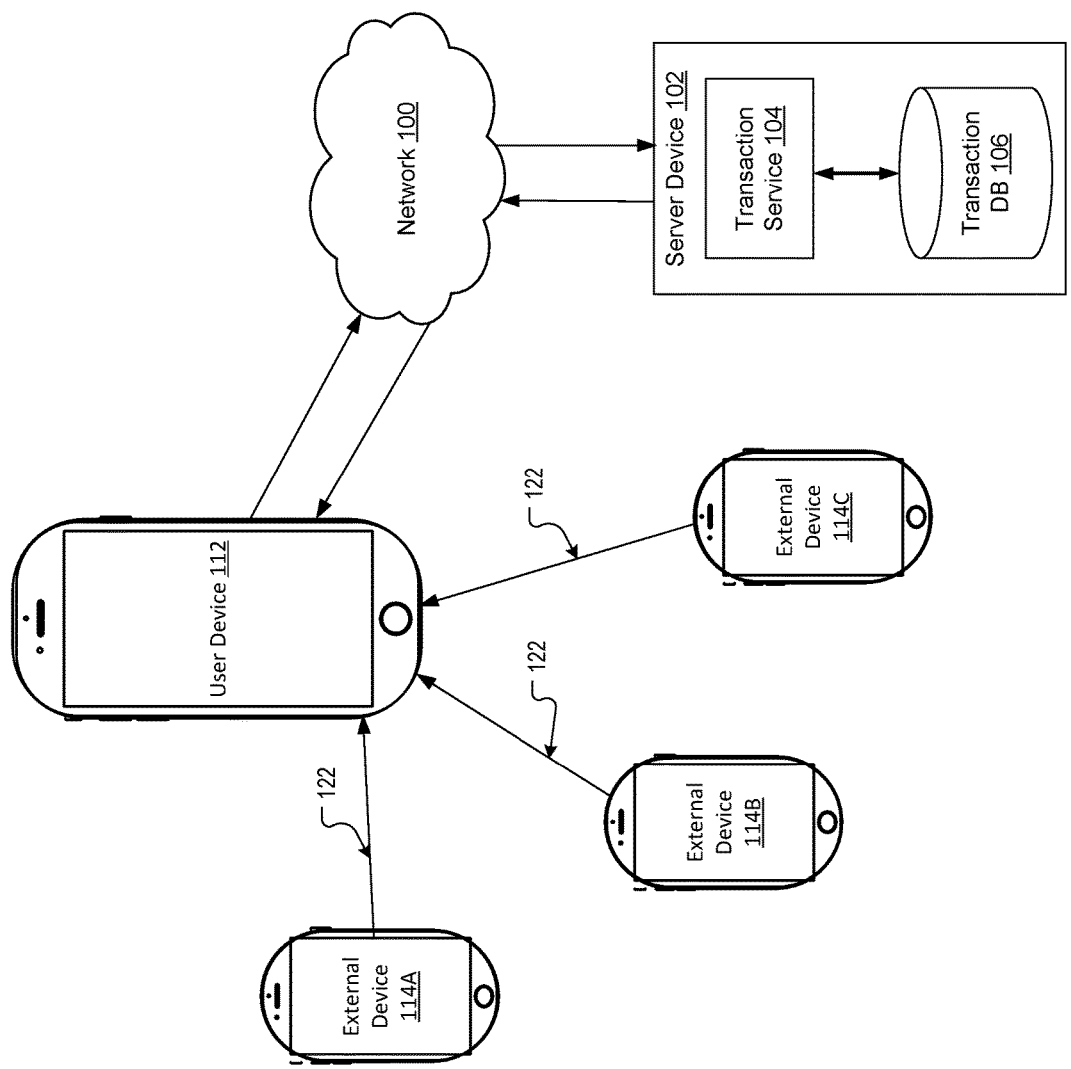

FIGS. 1A-1D show a network of trust according to an embodiment of the present disclosure. The network of trust may exist in the context of user device 112 performing or attempting to perform a transaction (e.g., purchasing something from a vendor in exchange for funds). User device 112 may be a smartphone, tablet, computer, or other device configured to request transactions. User device 112 may send transaction data to server device 102 by network 100 (e.g., the Internet or another public and/or private network). Server device 102 may be a server configured to debit, credit, and/or transfer money to and/or from an account of a user of user device 112. For example, server device 102 may be associated with a user's checking account or credit card account (for the purposes of providing an example, assume server device 102 is associated with a credit card account). Server device 102 may include transaction service 104, which may be configured to process transactions, and transaction database 106, which may be configured to store transaction and/or account data. Server device 102 is depicted as a single server including a single transaction service 104 and transaction database 106 for ease of illustration, but those of ordinary skill in the art will appreciate that server device 102 may be embodied in different forms for different implementations. For example, server device 102 may include a plurality of servers. In some embodiments, server device 102 may include transaction processing network servers (e.g. credit card processing servers), and payment transaction data may flow through transaction processing network servers before reaching transaction service 104.

User device 112 may send transaction data to server device 102, and server device 102 may use the transaction data to process the transaction and/or to decide whether to process the transaction. The transaction data may include data describing the transaction. For example, the transaction data may indicate the parties to the transaction and an amount (e.g., in currency) to be paid from the credit account of the payor (e.g., the owner of user device 112) to an account of the payee.

In some embodiments, user device 112 may include data with the transaction data that may be used by server device 102 to evaluate the trustworthiness of the requested transaction. For example, this data may include data identifying user device 112 and/or data describing the transaction (e.g., location, account information, transaction amount, good/ service purchased, time/day, etc.). In some embodiments, this data may include data identifying other devices in proximity with user device 112. For example, user device 112 may include data identifying one or more external devices 114 with the transaction data.

The data identifying the external devices 114 may provide an indicator of trustworthiness for one or more reasons. For example, if a user device 112 is frequently used to make similar types of purchases at similar times of day, the identity of nearby external devices 114 may provide an additional indicator of trustworthiness if the identities are consistent. For example, a user may go out to lunch or for coffee with coworkers at roughly consistent times of day several times a week. The consistent presence of the coworkers' external devices 114 may suggest that the user of user device 112 is attempting a legitimate purchase. Outside of working hours, the consistent presence of external devices 114 belonging to family members may suggest that user device 112 is in the hands of its true owner, and an attempted purchase is legitimate. In some embodiments, the actual identity of external devices 114 may not be relevant (e.g., the fact that an external device 114 belongs to the wife of the user of user device 112 may be irrelevant). However, the consistency of proximity during transactions may be relevant. Indeed, the presence of external devices 114 belonging to employees of a shop the user frequents, or external devices 114 of other persons unknown to the user but often close to the user, may be signs of legitimacy. Consistent external device 114 presence may suggest legitimacy, whereas a transaction attempted when there are no external devices 114 that user device 112 has ever been near before may suggest that the transaction has a higher chance than normal of being illegitimate (e.g., because user device 112 has been stolen or spoofed).

When user device 112 attempts a transaction, user device 112 may generate a transaction request, such as an authorization request to debit an account managed by server device 102. User device 112 may include information about external devices 114 in the request. For example, user device 112 may broadcast a challenge 120 using one or more wireless communication technologies (e.g., Bluetooth, WiFi, etc.). In some embodiments, challenge 120 may include a request to respond with information identifying the receiving external device 114. In some embodiments, challenge 120 may include a processing request whose result is to be returned by external device 114 (e.g., token processing as described herein). Challenge 120 may have a limited range. External devices 114 that are within challenge range of user device 112 may receive challenge 120.

An external device 114 that receives challenge 120 may send a response 122 back to user device 112. For example, external device 114 may send response 122 using the same one or more wireless communication technologies (e.g., Bluetooth, WiFi, etc.) by which challenge 120 was received. Response 122 may include information identifying external device 114, such as a unique device identifier. In some embodiments, only external devices 114 that are also registered with server device 102 (e.g., because they belong to account holders) may send responses 122. In some embodiments, device identifiers associated with account holders may be considered "trusted devices," the presence of which may suggest legitimacy.

In some embodiments, external devices 114 may operate as a mesh network. Thus, external devices 114 that are not in range of user device 112 when user device 112 broadcasts challenge 120 may share information about themselves (e.g., response 122) even if they are out of range. For example, assume each external device 114 has a range of 10 meters (this is used for example only, as other ranges may be possible. User device 112 may communicate with external device 114A. External device 114A may additionally reach out to external device 114B with a challenge and provide a verification response from external device 114B along with external device 114A's own response to user device 112.

User device 112 may include any device identifiers received from external devices 114 with the transaction request sent to server device 102. Transaction service 104 may examine the device identifiers to determine whether they are valid and/or recognized. For example, a device identifier for an external device 114 may be valid when it is a real identifier (as opposed to a spoofed identifier generated by hacking a device, for example) and/or when it is registered with server device 102 and stored in transaction database 106. A device identifier for an external device 114 may be recognized when it has been included in previous transaction requests from user device 112, for example. The presence of valid and recognized device identifiers may indicate that the requested transaction is likely to be legitimate, so transaction service 104 may lower or maintain a threat score for the transaction in this case. However, if one or more device identifiers is invalid or unrecognized, transaction service 104 may raise the threat score for the transaction. In some embodiments, transactions reaching a predetermined threat score threshold may be flagged for follow-up investigation and/or may be declined.

Figure 1D:
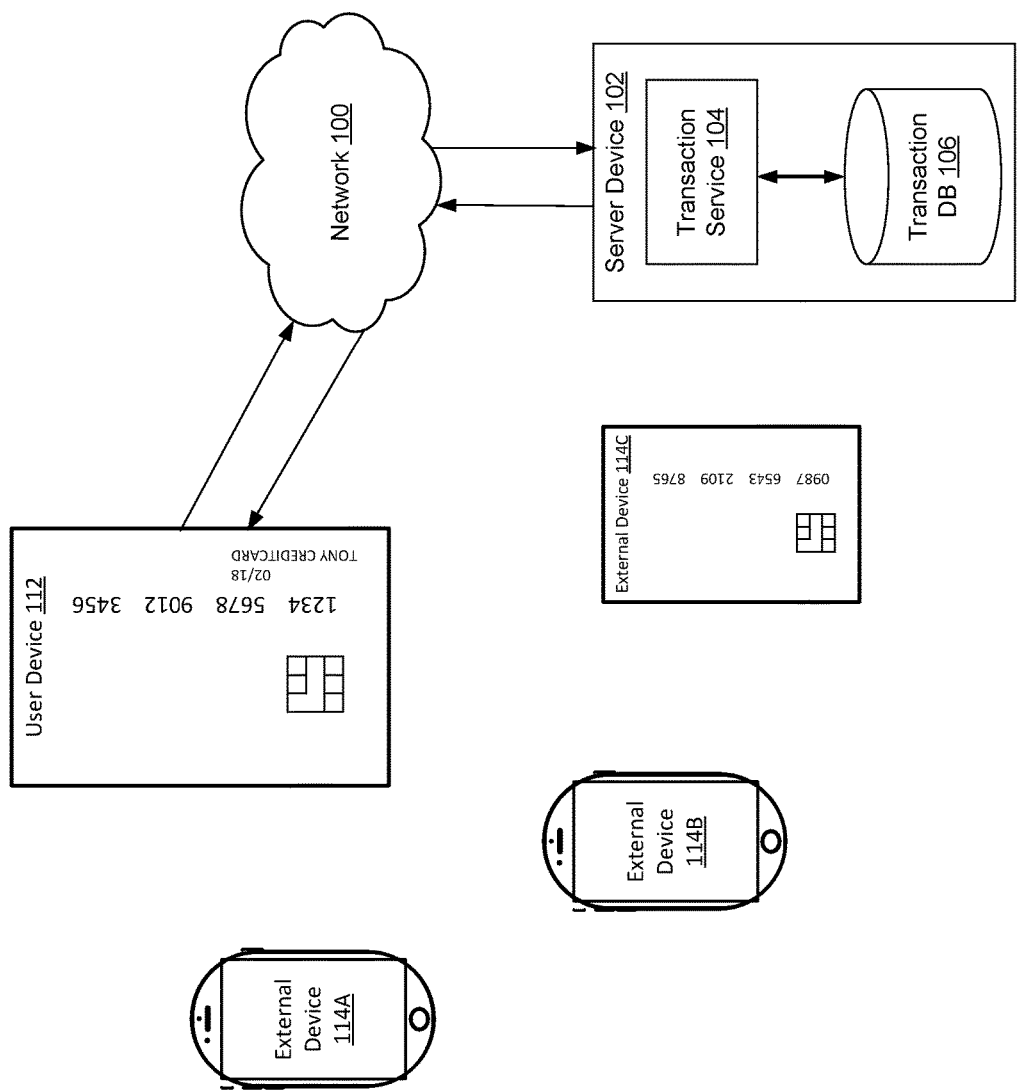

As shown in FIG. 1D, user devices 112 and/or external devices 114 need not necessarily be typical computing devices such as smartphones, tablets, personal computers, smart watches, fitness trackers, etc. In some embodiments, user device 112 and/or external devices 114 (e.g., external device 114C) may be credit or debit cards with data processing systems and functionality. For example, a credit or debit card may include one or more processors, power sources (e.g., rechargeable batteries), and/or communication systems (e.g., Bluetooth transceivers). Such credit or debit cards may be configured to perform the actions of user devices 112 and/or external devices 114 described herein. In some embodiments, such credit or debit cards may be configured to wake up certain components (e.g., processor, communication system, etc.) only during the transaction processing to conserve battery power.

Figure 2:
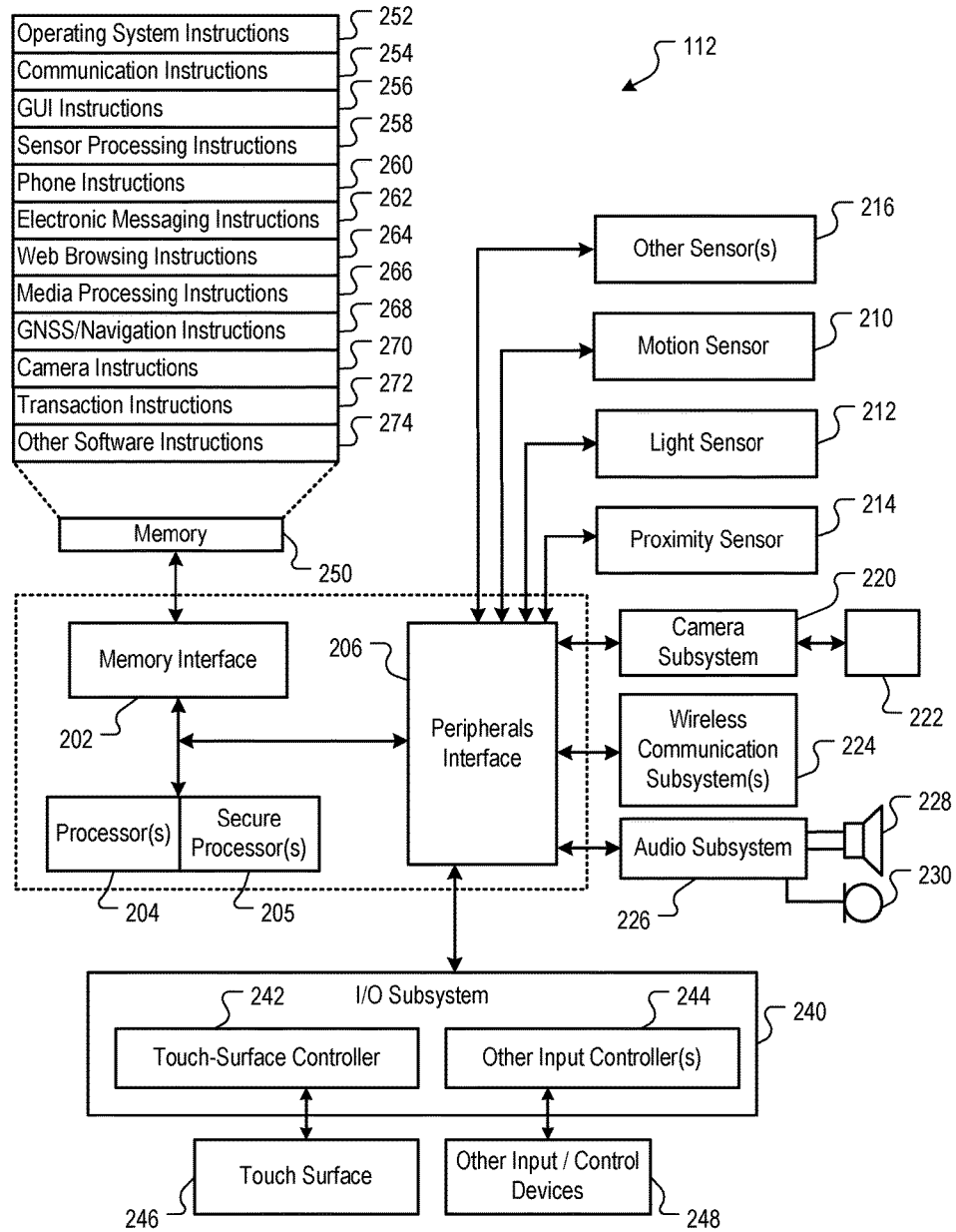
FIG. 2 shows a user device according to an embodiment of the present disclosure.

FIG. 2 shows a block diagram of an example computing device, for example a computing device configured to function as user device 112 and/or external device 114. For example, user device 112 may interact with external device 114 and/or server device 102 to gather data about local devices and include the data in transaction requests as described herein. The device illustrated in FIG. 2 is a user device (e.g., user device 112), but it will be understood that other devices such as external device 114 may be configured similarly. The user device 112 may include a memory interface 202, one or more data processors, image processors, central processing units 204, and/or secure processing units 205, and a peripherals interface 206. The memory interface 202, the one or more processors 204 and/or secure processors 205, and/or the peripherals interface 206 may be separate components or may be integrated in one or more integrated circuits. The various components in the user device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 224. The specific design and implementation of the communication subsystems 224 may depend on the communication network(s) over which the user device 112 is intended to operate. For example, the user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the user device 112 may present recorded audio and/or video files, such as MP3, AAC, and MPEG files. In some implementations, the user device 112 may include the functionality of an MP3 player, such as an iPod™. The user device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store transaction instructions 272 to facilitate other processes and functions, such as determining the presence of external devices 114, forming transaction requests, and/or communicating with server device 102 to process the transaction requests.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the user device 112 may be implemented in hardware and/or in software, including in one or more signal processing and/or application specific integrated circuits.

In some embodiments, processor 204 may perform processing including executing instructions stored in memory 250, and secure processor 205 may perform some processing in a secure environment that may be inaccessible to other components of user device 112. For example, secure processor 205 may include cryptographic algorithms on board, hardware encryption, and physical tamper proofing. Secure processor 205 may be manufactured in secure facilities. Secure processor 205 may encrypt data/challenges from external devices. Secure processor 205 may encrypt entire data packages that may be sent from user device 112 to the network. Secure processor 205 may separate a valid user/external device from a spoofed one, since a hacked or spoofed device may not have the private keys necessary to encrypt/decrypt, hash, or digitally sign data, as described herein.

Figure 3:
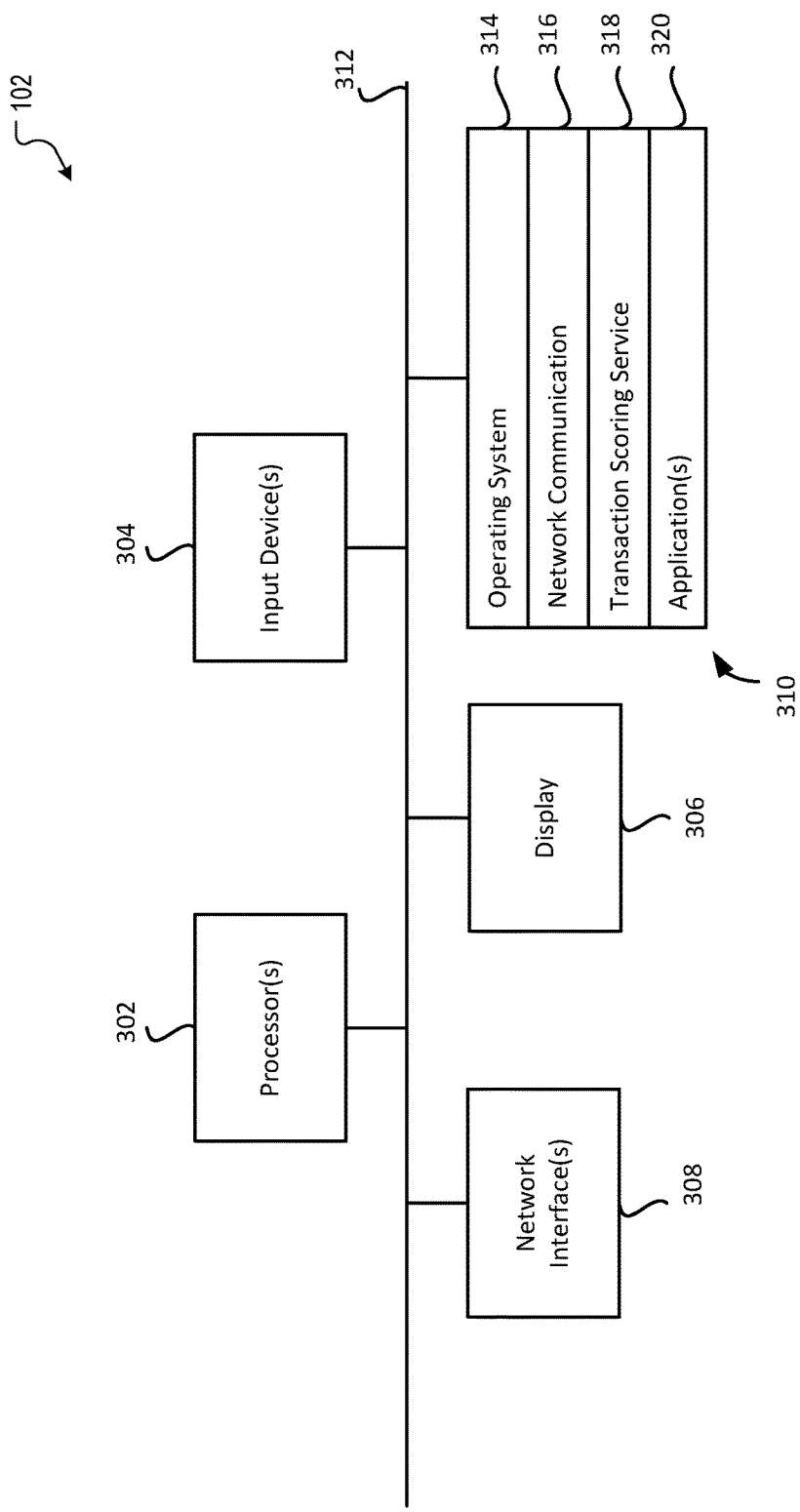
FIG. 3 shows a server device according to an embodiment of the present disclosure.

FIG. 3 is a block diagram of an example server device 102 that may implement various features and processes as described herein. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Transaction scoring service instructions 318 can include instructions that evaluate transaction requests as described herein. For example, scoring service instructions 318 may evaluate transaction requests based on information about other devices in the vicinity and/or adjust security scores for the transactions.

Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
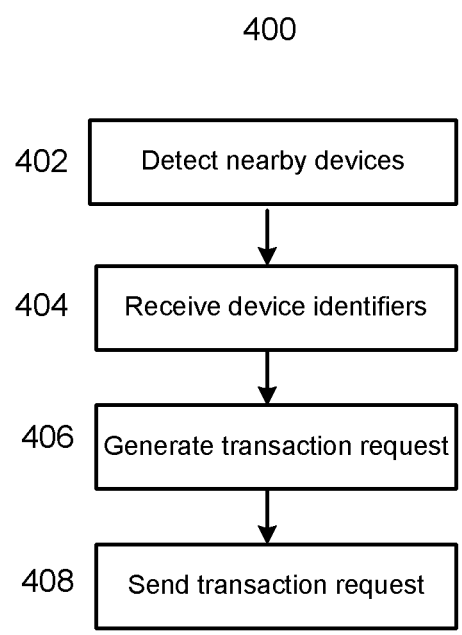
FIG. 4 shows a transaction request generation process according to an embodiment of the present disclosure.

FIG. 4 shows a transaction request generation process 400 according to an embodiment of the present disclosure. User device 112 may perform transaction request generation process 400 in response to a user interacting with user device 112 to attempt a transaction (e.g., using a transaction app installed on user device 112, tapping user device 112 on a tap-to-pay kiosk, swiping or inserting user device 112 in a reader for embodiments where user device 112 is a card, etc.).

At 402, user device 112 may detect external devices 114 that are within detection range. For example, user device 112 may broadcast a challenge 120 using one or more wireless communication technologies (e.g., Bluetooth, WiFi, etc.). Challenge 120 may have a limited range. External devices 114 that are within challenge range of user device 112 may receive challenge 120. In some embodiments, challenge 120 may include some type of processing request that external device 114 must complete. For example, challenge 120 may include a token to be validated by external device 114.

At 404, user device 112 may receive responses 122 to challenge 120 from external devices 114 that received challenge 120. For example, user device 122 may receive response 122 using the same one or more wireless communication technologies (e.g., Bluetooth, WiFi, etc.) by which challenge 120 was sent. Each response 122 may include information identifying external device 114 that sent the response, such as a unique device identifier. In some embodiments, only external devices 114 that are also registered with server device 102 (e.g., because they belong to account holders) may send responses 122. In some embodiments, user device 112 may evaluate response 122 to determine whether external device 114 has properly completed a processing request included in challenge 120. For example, response 122 may include a validated token sent with challenge 120. User device 112 may evaluate whether the token has been validated correctly.

At 406, user device 112 may generate a transaction request, such as an authorization request to debit an account managed by server device 102. User device 112 may include information about external devices 114 in the request. For example, user device 112 may include the unique device identifier(s) received at 404 in the transaction request. In some embodiments, user device 112 may only include device identifiers for external devices 114 that have appropriately responded to challenge 120 (e.g., by validating the token). In some embodiments, user device 112 may include device identifiers for external devices 114 that have inappropriately responded to challenge 120 (e.g., by not validating the token correctly), but also include data indicating that the external device 114 responded incorrectly. User device 112 may also include data identifying user device 112 and/or data describing the transaction (e.g., location, account information, transaction amount, good/service purchased, time/day, etc.). In some embodiments, user device 112 may encrypt the transaction request. In some embodiments, user device 112 may format the transaction request into a standard authorization format (e.g., a format specified by Apple Pay, Google Wallet, or other payment services).

In some embodiments, it may be possible to decline the transaction at this stage if there are suspicious external devices 114 or unknown external devices 114 detected. This functionality may depend on the type of user device 112, with some user devices 112 being powerful enough to process the transaction request locally using a fraud model. If this processing indicates a risk score or confidence that is reduced, due to the presence of one or more spoofed external devices 114 or failed challenges, then the transaction could be declined. Alternatively, in the case of a highly unusually transaction (e.g. high dollar amount, unusual purchase type, or risky merchant) the risk score or confidence may be very low initially, and if the score is not improved with the help of trusted external devices 114, that type of transaction could also be declined. This processing may be similar to processing done at server device 102 to evaluate the transaction in some embodiments. However, by performing the processing locally (when possible), network bandwidth may be saved, and user device 112 may act as a logical short circuit. Additionally, performing the processing locally may provide a fallback (e.g., for transactions attempted on a plane or in another location where transactions are processed offline, such that user device 112 does not connect to the payment networks until a later time).

At 408, user device 112 may send the transaction request to server device 102. By sending the transaction request, user device 112 may direct server device 102 to process the transaction.

Note that while challenge 120 is sent in response to a user attempting a transaction in this example, challenge 120 may be generated based on other triggers in some embodiments. For example, user device 112 may send challenge 120 periodically or when user device 112 enters a particular location or moves to a new location. In such cases, user device 112 may use the most recently received responses to challenge 120 with the transaction request. Accordingly, user device 112 may be configured to regularly monitor its surroundings to detect nearby external devices 114. This information may be used to detect frequent associations that may provide an indicator of trust or legitimacy even if the external devices 114 haven't been in communication during or associated with a prior transaction.

Figure 5:
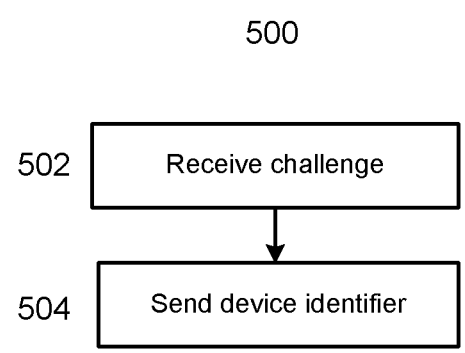
FIG. 5 shows an identity reporting process according to an embodiment of the present disclosure.

FIG. 5 shows an identity reporting process 500 according to an embodiment of the present disclosure. One or more external devices 114 may perform identity reporting process 500 in response to receiving a challenge from user device 112 (e.g., at 402 of process 400 described above).

At 502, external device 114 may receive challenge 120 from user device 112. External devices 114 that are within challenge range of user device 112 may receive challenge 120. In some embodiments, only external devices 114 that are also registered with server device 102 (e.g., because they belong to account holders) may continue processing according to identity reporting process 500 after receiving challenge 120.

At 504, external device 114 may generate and send a response 122 to challenge 120. For example, external device 114 may send response 122 using the same one or more wireless communication technologies (e.g., Bluetooth, WiFi, etc.) by which challenge 120 was received. Response 122 may include information identifying external device 114, such as a unique device identifier. In some embodiments, where challenge 120 includes a processing request, external device 114 may perform the requested processing and include a result thereof (e.g., a validated token) in response 122.

Figure 6:
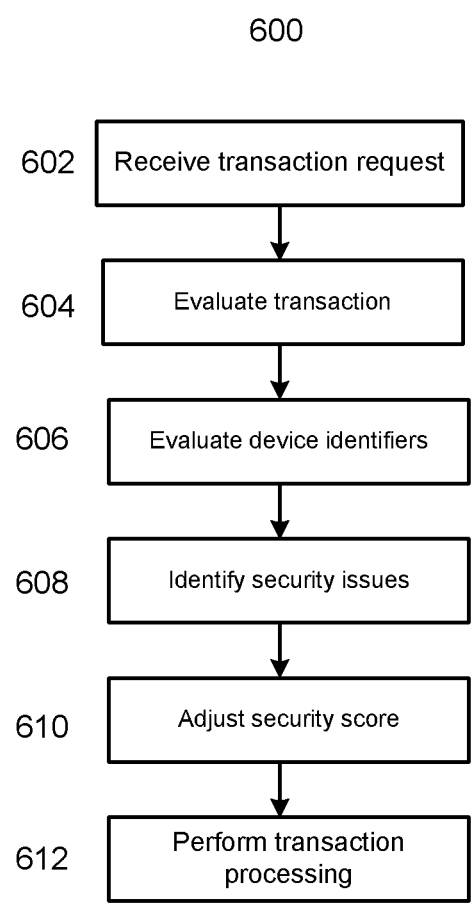
FIG. 6 shows a transaction evaluation process according to an embodiment of the present disclosure.

FIG. 6 shows a transaction evaluation process 600 according to an embodiment of the present disclosure. Server device 102 may perform transaction evaluation process 600 in response to receiving a transaction request from user device 112, for example.

At 602, server device 102 may receive the transaction request from user device 112. For example, server device 102 may receive the transaction request through the Internet and/or another public and/or private network.

At 604, server device 102 may evaluate the transaction that has been requested. For example, transaction service 104 may decrypt the transaction request if it is encrypted. Transaction service 104 may evaluate the data identifying user device 112 and/or data describing the transaction. For example, transaction service 104 may identify the account involved with the transaction and determine whether it contains enough value to complete the transaction. Transaction service 104 may evaluate the data to identify indicators of possible fraud or error separate from the external device 114 information as well. Transaction service 104 may perform any other type of processing necessary to conduct the requested transaction.

At 606, server device 102 may evaluate the external device 114 identifying information included in the transaction request. For example, transaction service 104 may examine the device identifiers to determine whether they are valid and/or recognized. For example, a device identifier for an external device 114 may be valid when it is a real identifier (as opposed to a spoofed identifier generated by hacking a device, for example) and/or when it is registered with server device 102 and stored in transaction database 106. A device identifier for an external device 114 may be recognized when it has been included in previous transaction requests from user device 112, for example.

At 608, server device 102 may identify security issues, or possible security issues, with the transaction. For example, transaction service 104 may determine whether any of the data identifying user device 112 and/or data describing the transaction is suspicious using any of a variety of known evaluation techniques. In some embodiments, transaction service 104 may examine the results of evaluation of the external device 114 identifying information to identify suspicious indicators. For example, the presence of valid and recognized device identifiers may indicate that the requested transaction is likely to be legitimate. However, if one or more device identifiers is invalid or unrecognized, this may indicate that the requested transaction has an elevated risk of being illegitimate. In another example, if the transaction request included an indication that an external device 114 responded to a challenge incorrectly, this may raise suspicion.

At 610, server device 102 may adjust a security score for the transaction based on processing at 608. For example, the presence of valid and recognized device identifiers may indicate that the requested transaction is likely to be legitimate, so transaction service 104 may lower or maintain a threat score for the transaction in this case. However, if one or more device identifiers is invalid or unrecognized, transaction service 104 may raise the threat score for the transaction.

At 612, server device 102 may perform transaction processing. For example, transaction service 104 may process the transaction according to the information in the request. In some embodiments, transactions reaching a predetermined threat score threshold (e.g., based on processing at 610) may be flagged for follow-up investigation and/or may be declined. In some embodiments, transaction service 104 may perform additional processing, apart from the transaction processing, based on processing at 608. For example, in the case where the transaction request included an indication that an external device 114 responded to a challenge incorrectly, transaction service 104 may generate and send a message to an account owner associated with the external device 114 indicating that their device may be compromised or stolen.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system configured to process secure transactions, the system comprising:
 a processor;
 a transceiver in communication with the processor; and
 a non-transitory memory storing instructions that, when executed by the processor, cause the processor to perform processing comprising:
  receiving, by the transceiver, a transaction request from a user device, the transaction request comprising data describing a transaction to be processed and at least one external user device identifier describing at least one external user device detected by the user device in proximity to the user device;
  analyzing the at least one external user device identifier to identify at least one suspicious security factor associated with the at least one external user device identifier, the analyzing comprising determining that the presence of the at least one external user device identifier is indicative of potential fraud;
  adjusting a security score for the transaction based on the at least one security factor; and based on the adjusted security score, applying a fraud model test to the transaction, wherein the transaction is processed in response to passing the fraud model test or denied in response to failing the fraud model test.

2. The system of claim 1, further comprising:
receiving at least one additional external user device identifier describing at least one additional external user device detected by the user device in proximity to the user device; and
analyzing the at least one additional external user device identifier to identify at least one favorable security factor associated with the at least one additional external user device identifier, the analyzing comprising determining whether the at least one additional external user device detected by the user device was detected by the user device during at least one previous transaction;
wherein the presence of the at least one additional external user device detected by the user device near the user device during the at least one previous transaction causes an improvement in the security score for the transaction during the adjusting.

3. The system of claim 1, further comprising:
receiving at least one additional external user device identifier describing at least one additional external user device detected by the user device in proximity to the user device; and
analyzing the at least one additional external user device identifier to identify at least one favorable security factor associated with the at least one additional external user device identifier, the analyzing comprising:
identifying a transaction type; and
determining whether the at least one additional external user device detected by the user device was detected by the user device during at least one previous transaction having the transaction type;
wherein the presence of the at least one additional external user device detected by the user device near the user device during the at least one previous transaction having the transaction type causes an improvement in the security score for the transaction during the adjusting.

4. The system of claim 1, further comprising:
receiving at least one additional external user device identifier describing at least one additional external user device detected by the user device in proximity to the user device; and
analyzing the at least one additional external user device identifier to identify at least one favorable security factor associated with the at least one additional external user device identifier, the analyzing comprising:
identifying a transaction location; and
determining whether the at least one additional external user device detected by the user device was detected by the user device during at least one previous transaction having the transaction location; and
the presence of the at least one additional external user device detected by the user device near the user device during the at least one previous transaction having the transaction location causes an improvement in the security score for the transaction during the adjusting.

5. The system of claim 1, further comprising:
receiving at least one additional external user device identifier describing at least one additional external user device detected by the user device in proximity to the user device; and
analyzing the at least one additional external user device identifier to identify at least one favorable security factor associated with the at least one additional external user device identifier, the analyzing comprising:
identifying a transaction time; and
determining whether the at least one additional external user device detected by the user device was detected by the user device during at least one previous transaction having the transaction time; and
the presence of the at least one additional external user device detected by the user device near the user device during the at least one previous transaction having the transaction time causes an improvement in the security score for the transaction during the adjusting.

6. The system of claim 1, wherein:
the at least one suspicious security factor includes an anomaly of at least one external user device identifier.

7. The system of claim 1, wherein:
the processing further comprises analyzing the data describing the transaction to be processed to identify at least one additional security factor associated with the data describing the transaction to be processed, the at least one additional security factor comprising at least one of a transaction amount, a merchant identity, a transaction type, a transaction time, and a transaction location; and
the adjusting is further based on the at least one additional security factor.

8. The system of claim 1, wherein the at least one external user device includes at least one of a cellphone and a tablet.

9. The system of claim 1, wherein the at least one external user device identifier includes an indication of a user account into which at least one external user is logged in on the at least one external user device.

10. The system of claim 1, wherein:
the at least one suspicious security factor includes an incorrect response to a challenge from the at least one external user device.

11. The system of claim 1, wherein:
the presence of the at least one suspicious security factor causes a downgrade in the security score for the transaction during the adjusting.

12. The system of claim 6, wherein:
the anomaly includes an invalid or unrecognized device identifier.

* * * * *